US007047167B2

(12) United States Patent
Yamaguchi et al.

(10) Patent No.: US 7,047,167 B2
(45) Date of Patent: May 16, 2006

(54) BLADE SHAPE DESIGNING METHOD, PROGRAM THEREOF AND INFORMATION MEDIUM HAVING THE PROGRAM RECORDED THEREON

(75) Inventors: Yoshihiro Yamaguchi, Saitama (JP); Toshiyuki Arima, Saitama (JP)

(73) Assignee: Honda Giken Kogyo Kabushiki Kaisa, Tokyo (JP)

( * ) Notice: Subject to any disclaimer, the term of this patent is extended or adjusted under 35 U.S.C. 154(b) by 753 days.

(21) Appl. No.: 09/930,914

(22) Filed: Aug. 15, 2001

(65) Prior Publication Data

US 2002/0065636 A1 May 30, 2002

(30) Foreign Application Priority Data

Sep. 5, 2000 (JP) .............................. 2000-268316

(51) Int. Cl.
*G06F 17/10* (2006.01)
(52) U.S. Cl. ...................... 703/2; 703/6; 703/7; 706/15; 706/26
(58) Field of Classification Search ................ 703/6, 703/7, 9; 706/15, 26; 702/2
See application file for complete search history.

(56) References Cited

U.S. PATENT DOCUMENTS

| | | | | |
|---|---|---|---|---|
| 5,524,341 A | * | 6/1996 | Ferleger et al. ............. | 29/889.7 |
| 6,022,188 A | * | 2/2000 | Bancalari ..................... | 415/115 |
| 6,062,819 A | * | 5/2000 | Zangeneh et al. ......... | 416/186 R |
| 6,139,268 A | * | 10/2000 | Murawski et al. ............. | 416/23 |
| 6,315,420 B1 | * | 11/2001 | Standen et al. ............. | 359/871 |
| 6,419,187 B1 | * | 7/2002 | Buter et al. ................ | 244/35 R |
| 6,527,510 B1 | * | 3/2003 | Olhofer et al. ............. | 415/191 |
| 6,606,612 B1 | * | 8/2003 | Rai et al. ....................... | 706/15 |
| 6,638,021 B1 | * | 10/2003 | Olhofer et al. ............. | 416/242 |
| 6,654,710 B1 | * | 11/2003 | Keller ........................... | 703/9 |
| 2002/0099929 A1 | * | 7/2002 | Jin et al. ..................... | 712/220 |
| 2002/0138457 A1 | * | 9/2002 | Jin et al. ...................... | 706/26 |
| 2002/0177985 A1 | * | 11/2002 | Kraft et al. ................... | 703/7 |

FOREIGN PATENT DOCUMENTS

| | | |
|---|---|---|
| JP | 9325949 | 12/1997 |
| JP | 10149384 | 6/1998 |

OTHER PUBLICATIONS

"An Updated Survey of GA-Based Multiobjective Optimization Techniques", C.A. Coello, ACM Computing Surveys, vol. 32, No. 2, Jun. 2000.*

(Continued)

*Primary Examiner*—Fred Ferris
(74) *Attorney, Agent, or Firm*—Fenwick & West LLP

(57) ABSTRACT

An initial set of individuals having design parameters of a blade as a gene, is determined at random (S12). Next, an analysis using Navier-Stokes equations is performed. On the basis of the analysis result, ranking (evaluation) of respective individuals are performed using a pressure loss coefficient, a trailing edge deviation angle and the like as objective functions (S14). When a shape of a blade having a desirable performance is obtained, or when a predetermined number of generations is achieved, the analysis is terminated assuming that a termination condition has been met (S22). When the termination condition has not been met, processes about individual selection, crossing between individuals and mutation are performed so that generation is incremented by 1. The above processes are repeated, so that Pareto solutions can be obtained according to MOGA in consideration of a trade-off relationship between the objective functions.

4 Claims, 11 Drawing Sheets

OTHER PUBLICATIONS

"Aerodynamic and Aeroacoustic Optimization of Airfoils via a Parallel Genetic Algorithm", B.R. Jones et al, AIAA 98-4811, 1998.*

"Multiobjective Optimization with Messy Genetic Algorithms", D.A. Van Veldhuizen et al, SAC 00', ACM 1-58113-239-5/00/003, ACM May 2000.*

"Multidiciplinary Turbomachinery Blade Design Optimization", R. Dornberger et al, AIAA-2000-0838, AIAA 2000.*

"Multi-Objective Optimization of Turbomachinery Cascades for Minimum Loss, Maximum Loading, and Maximum Gap-to-Chord Ratio", Dennis et al, 8th AIAA/NASA/USAF/ISSMO Symposium on MAO, AIAA 2000-4876, Sep. 2000.*

"Multidiciplinary Optimization in Turbomachinery Design", R. Dornberger et al, ECCOMAS 2000.*

"Multiobjective Evolutionary Algorithm Test Suites", D.A. Van Veldhuizen, ACM 1-58113-086-4/99/0001, ACM 1998.*

Fonseca, Carlos M., et al., "Genetic Algorithms for Multiobjective Optimization: Formulation, Discussion and Generalization", Proceedings of the Fifth International Conference on Genetic Algorithms, University of Illinois, Jul. 17-21, 1993, pp. 416-423.

Michalewicz, Zbigniew, "GAs: What are they?", Genetric Algorithms+ Data Structures=Evolution Programs, Book excerpts at Chapters 1, 2; pp. 13-44.

* cited by examiner

BLADE SHAPE DESIGNING METHOD, PROGRAM THEREOF AND INFORMATION MEDIUM HAVING THE PROGRAM RECORDED THEREON

BACKGROUND OF THE INVENTION

1. Field of the Invention

The present invention relates to a method for designing a blade shape in a blade cascade of an axial compressor.

2. Description of the Related Art

The shape of a blade in a blade cascade of an axial compressor affects performances of the axial compressor largely. Various trials or tests for optimizing the shape of a blade have been made. In Japanese Patent Application Laid-Open (KOKAI) No. 10-149384, there has been disclosed a designing method characterized in that, in order that pressure loss may be optimized while objective functions about many design variables are evaluated, a compressive viscous fluid equation is solved and the computation time required for the solution does not depend on the number of design variables.

In detail, by solving simultaneous linear equations of the same order with a compressive viscous fluid equation derived from an implicit function theorem, only once, a gradient of objective functions about many design variables can be obtained simultaneously. As the objective functions or restraints, an outflow angle of fluid downstream the blade cascade, a pressure gradient on a blade surface and the like are adopted.

As understood from the above, it is one of important problems in design of an axial compressor to design a blade shape in consideration of various design variables.

When the conventional method based upon the gradient is employed, a local optimal solution can be obtained in some cases. Also, even when an actual or desirable optimal solution is obtained, it is difficult to determine whether or not the solution is the actual optimal solution. Furthermore, the method has such a disadvantage that it is not coincident with non-linearity and discontinuity of aerodynamic evaluation occurring in a change of profile and therefore it has less flexibility to various applications. For this reason, recently, the traditional gradient based methods have been giving way to statistic methods using evolutionary algorithms (EAs) and artificial neural networks (ANNs) which are easily adjustable to the non-linearity and have a flexibility for various applications.

SUMMARY OF THE INVENTION

In view of the above tendency or trend, an object of the present invention is to provide a novel method for design of a blade shape.

According to a first aspect of the present invention, there is provided a blade shape designing method where a shape of a blade is designed while a plurality of objective functions are optimized, wherein the plurality of objective functions include an incidence toughness, and optimization analysis is performed on the plurality of objective functions according to Pareto optimization approach so that Pareto solutions can be found on the basis of consideration of a trade-off relationship between the objective functions.

Preferably, the plurality of objective functions include at least one of a trailing edge deviation angle, a pressure loss coefficient, a maximum slope of blade surface Mach number or pressure distribution, a lift/drag (L/D) ratio, and a blade load.

Preferably, the incidence toughness is evaluated by the sum of first and second evaluation values of a parameter evaluating the shape, which can be obtained by evaluating first and second incident angles whose signs are opposite to each other, with respect to a design point of an incident angle, respectively.

More preferably, the absolute values of the first and second incident angles are 10° or less.

Preferably, the Pareto optimization approach is a Multi-Objective Genetic Algorithm.

According to a second aspect of the invention, there is provided an information medium on which a computer-readable program is recorded for a computer to execute a blade shape designing method where a shape of a blade is designed while a plurality of objective functions are optimized, wherein the program instructs the computer to execute a step where incidence toughness is set as one of the plurality of objective functions and a step where optimization analysis according to Pareto optimization approach is performed on the plurality of objective functions so that Pareto solutions are obtained on the basis of consideration of a trade-off relationship between the plurality of objective functions.

According to a second aspect of the invention, there is provided a program for a computer to execute a blade shape designing method where a shape of a blade is designed while a plurality of objective functions are optimized, wherein the program instructs the computer to execute a step where incidence toughness is set as one of the plurality of objective functions and a step where optimization analysis according to Pareto optimization approach is performed on the plurality of objective functions so that Pareto solutions are obtained on the basis of consideration of a trade-off relationship between the plurality of objective functions.

DETAILED DESCRIPTION OF PREFERRED EMBODIMENTS

In order to increase efficiency of an axial compressor, it is necessary to design a blade whose shape minimizes a pressure loss coefficient. However, only the pressure loss coefficient is not an important element for designing. In view of safety and efficiency, it is preferable that the axial compressor operates stably. In order to achieve a stable operation, it is necessary to design a blade having a shape which reduces influence due to change in an inflow angle of air. For this, it is required that a property resistant to lowering of performance of a blade caused by a change in the inflow angle (deterioration of an evaluation value of such a parameter as a pressure loss coefficient), that is, an incidence toughness should be evaluated. Now, in this embodiment, an explanation will be made about a method for designing a blade which is provided in an axial compressor employed under transonic conditions and whose incidence toughness has been considered as one of objective functions.

As an approach where a plurality of objective functions is optimized while a trade-off relationship therebetween is being considered, there is a Pareto optimization approach. The Pareto optimization approach is an approach which achieves optimization by obtaining plural or infinite Pareto solutions. As the Pareto optimizing approach, besides VEGA (Vector evaluated GA), NPGA (Niched Pareto GA), NSGA (Non-dominated Sorting GA), SPEA, PAES (Pareto archive Evolution Strategy) and the like, an approach using MOGA (Multi-Objective Genetic Algorithm) is known. MOGA is an algorithm which directly finds Pareto solutions using Genetic Algorithm (GA) which is one of Evolutionary Algorithms (EAs). In the present embodiment, a case of using MOGA as one example of the Pareto optimization approaches will be explained below.

First of all, the summary of the MOGA will be explained. A plurality of parameters is reflected to nature of a gene. A set of solutions can be obtained through the steps of determination of initial set, evaluation, selection, crossing, and mutation, and collective Pareto solutions are discriminated from the set.

Figure 1:
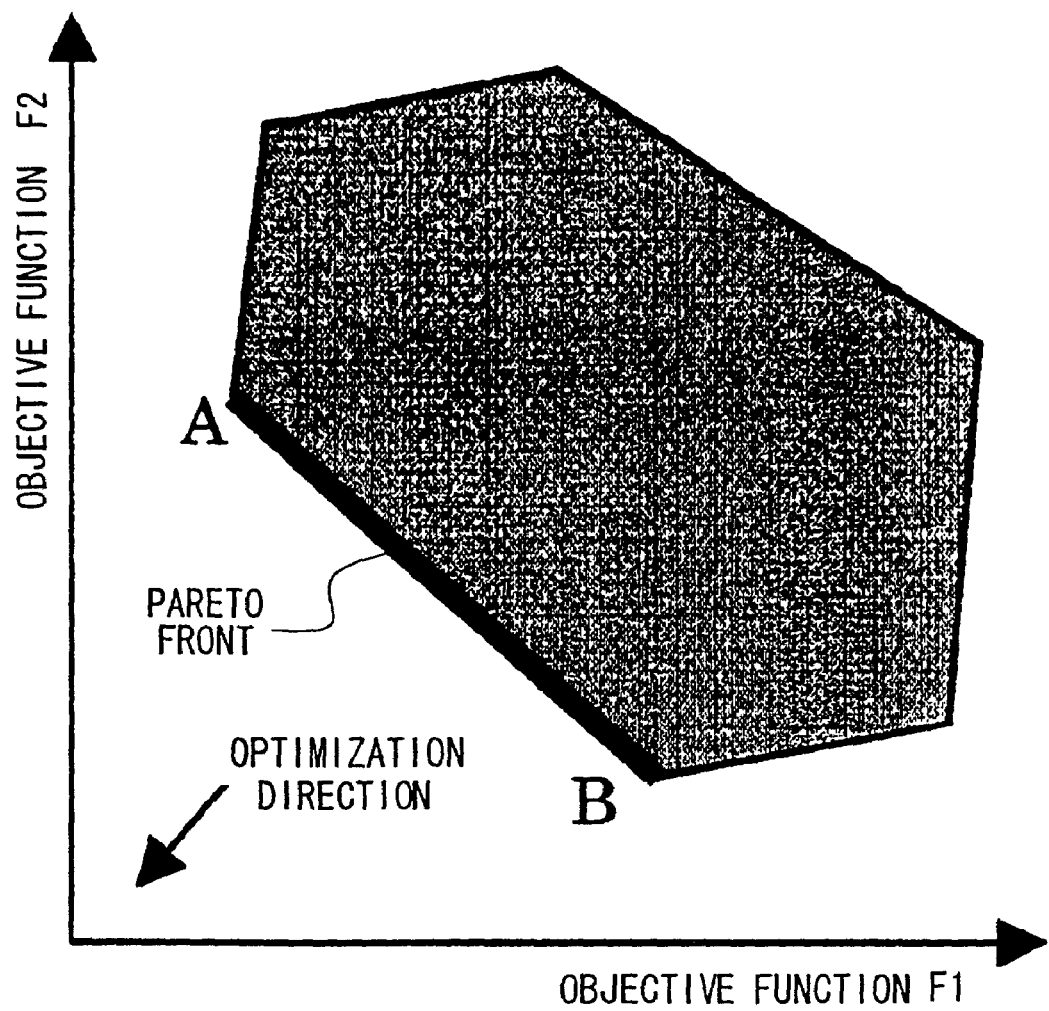
FIG. 1 is an illustrative diagram showing a distribution of solutions of an optimizing method using MOGA (Multi-Objective Genetic Algorithm)

FIG. 1 is an illustrative diagram showing a set of solutions. A gray colored region indicates a region where solutions exist. In this figure, the horizontal axis (abscissa) and the vertical axis (ordinate) indicate an objective function F1 and an objective function F2, respectively. A direction of arrow towards the crossing point of the abscissa and the ordinate in the figure indicates a direction of optimization, and the degree of optimization is increased as the coordinates of a point approaches to the crossing point. A thick line connecting a point A and a point B in the figure, which is a forefront line in the direction of optimization of the area with oblique lines is called Pareto Front. The Pareto Front provides Pareto solutions which constitute a set of non-dominated solutions. A designer can determine a shape of a blade by selecting an individual(s) having a desired nature among the Pareto solutions. A method according to the present embodiment will be explained below in detail.

First of all, the objective function will be explained. In this embodiment, for simplification of the explanation, a case where three parameters of incidence toughness, pressure loss coefficient and trailing edge deviation angle are selected as the objective functions to be optimized, is adopted. Of course, besides the above parameters, it is possible to add, for example, the maximum slope of blade surface Mach number (or pressure) distribution, L/D ratio (lift/drag ratio) and blade load as parameters to be optimized.

For evaluating the incidence toughness, for example, it is sufficient to observe the degree of a change in the pressure loss coefficient occurring according to a change in inflow angle. It is possible to make the evaluation using an objective function other than the pressure loss coefficient, which will be described later. Now, a case in which the pressure loss coefficient is used, will be explained.

There are a variety of evaluation functions of the incidence toughness, which depend on the pressure loss coefficient. For example, one of the following three equations can be used as the evaluation function.

$$f1 = PL(+5°) + PL(-5°) \quad (1)$$

$$f2 = PL(0°) + PL(+5°) + PL(-5°) \quad (2)$$

$$f3 = |PL(+5°) - PL(0°)| + |PL(-5°) - PL(0°)| \quad (3)$$

Regarding the above evaluation functions f1 to f3, PL(x) indicates a pressure loss coefficient obtained when an incident angle is "x". The relationship between the incident angle and the inflow angle will be explained with reference to FIG. 2.

Figure 2:
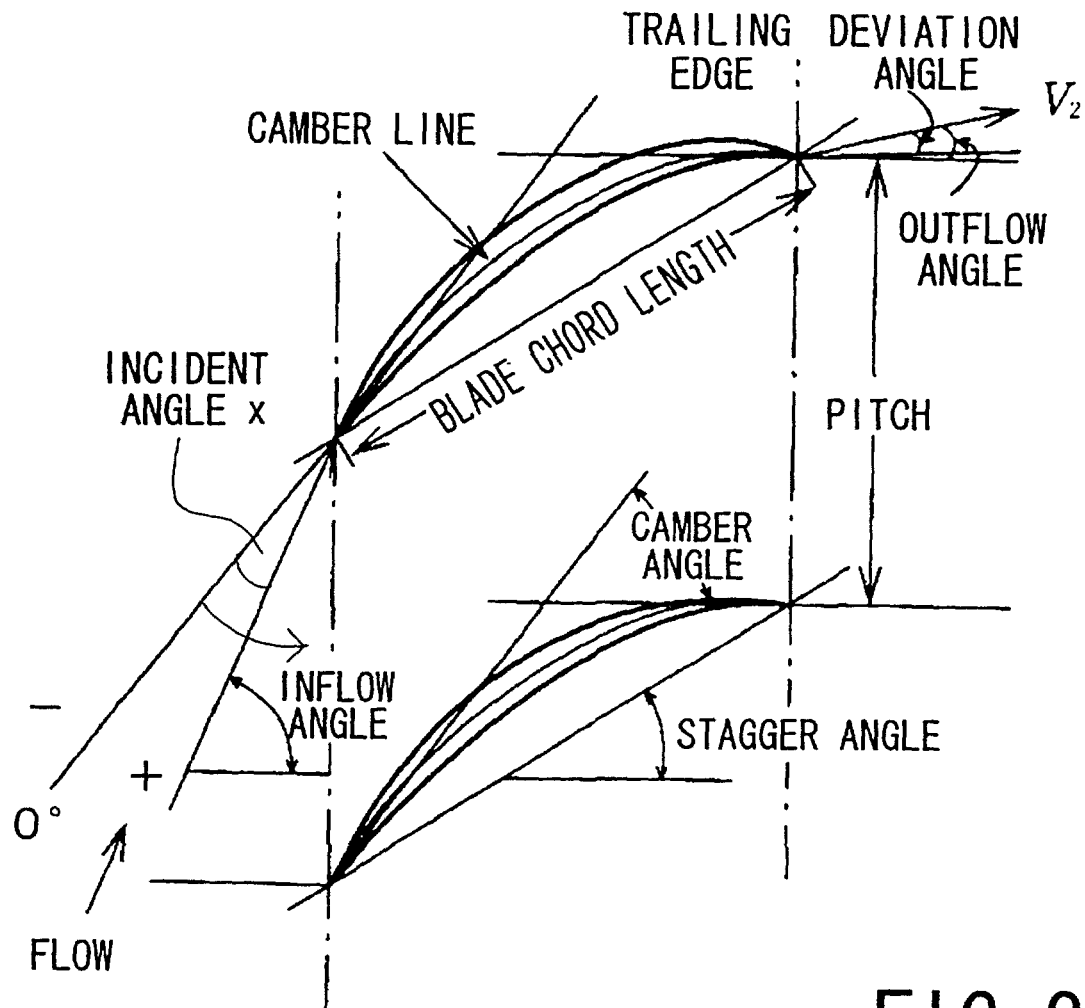
FIG. 2 is an illustrative diagram showing setting of an incident angle x.

FIG. 2 is an illustrative diagram showing setting of an incident angle x. The incident angle x is an angle formed by a tangential direction at a front edge section of a camber line and an inflow direction. At a design point in this tangential direction at the front edge section, the incidental angle becomes "0" degree, and the counterclockwise direction is set as a direction in which the incidental angle x increases. That is, sandwiching the design point where the incident angle becomes 0°, a blade back side is defined as minus while a blade ventral side is defined as plus.

The equation (1) shows that in the evaluation function f1 a pressure loss coefficient in a case that the incident angle is +5° is added to that in a case that the incident angle is -5°. Accordingly, the equation (1) is intended to optimize the incidence toughness by minimizing the pressure loss coefficients in consideration of the two cases where air flows in at incident angles of ±5°. On the other hand, the equation (2) shows that in the evaluation function f2 a pressure loss coefficient in a case that the incident angle is 0°, is further added to the sum of the equation (1). This is intended to optimize the incidence toughness in consideration of three incident angles.

The equation (3) is intended to carry out the evaluation in a manner different from the above two equations. In the equation (3), an absolute value of a difference in pressure loss coefficient between a case that the incident angle is +5° and a case that it is 0° is added to that between a case that the incident angle is -5° and a case that it is 0°. This equation is intended to optimize the incidence toughness through such analysis that the differences between the cases incident angles are ±5° and the case that an incident angle is 0° are minimized.

The optimization may be performed using any one of the equations (1) to (3), but an equation which is considered to be the most preferable one in the equations, is the equation (1). This is because, since a pressure loss coefficient at a design point is included in the equations (2) and (3), a correlation between the pressure loss coefficient, which is another objective function, and the incidence toughness, is present. The presence of a correlation between the objective functions, is not preferable when optimization is made in consideration of a trade-off. In detail, there is a possibility that a significant difference is not present, between the result obtained using the equation (2) and the result obtained when the pressure loss coefficient has been minimized in consideration of the design point alone. When the equation (3) is adopted, the performance in the cases that the incident angles are ±5° can be improved but the performance at the design point may be deteriorated.

Accordingly, for purely optimizing the incidence toughness indicating deterioration in performance according to a change in incident angle, the equation (1) is considered to be optimal, in which two incident angles alone which are positioned on both sides of the design point and whose signs are opposite to each other are considered. If the pressure loss coefficients in the two incident angles are suppressed, the incidence toughness is improved necessarily.

In the above explanation, the example where pressure loss coefficients are adopted as the parameter for determining the evaluation value of the incidence toughness and the sum of the two evaluation values of the pressure loss coefficients is used, has been explained. However, it is possible to use a parameter other than the pressure loss coefficient. For example, such a procedure can be employed that a trailing edge deviation angle is evaluated with two incident angles whose signs are opposite and these two evaluation values are summed to form an index for incidence toughness. That is, the incidence toughness can be evaluated by using any of the parameters which are evaluated in CFD calculation described later.

Here, it is not required necessarily the parameter used for evaluation of the incidence toughness is an objective function itself which is the subject of a trade-off. For example, it is possible to set the incidence toughness, the trailing edge deviation angle and the pressure loss coefficient, as the subjects of the trade-off and to evaluate the incidence toughness by the sum of lift/drag ratios. In this case, the lift/drag ratio is not a subject of the trade-off, but the evaluation value thereof is obtained as one of parameters for evaluating the shape of a blade in the CFD calculation described later.

Further, 5 degrees have been adopted as the absolute value of the incident angle in the equation (1), but the angle is not limited to this value alone necessarily. In view of an actual use, it is considered realistic that the magnitude or degree of the incident angle is 10° or less. Also, it is not required necessarily that the values of the incident angles are set symmetrically such as ±5°. For example, it is possible to perform optimization even when the incident angles are set to −5° and +6°.

Evaluation functions for the pressure loss coefficient and the trailing edge deviation angle, which are other objective functions, are respectively set. Evaluation of the pressure loss coefficient can be made on, for example, the basis of the pressure loss coefficient PL(0°) where the incident angle is 0°. Similarly, evaluation of the trailing edge deviation angle can also be made on the basis of the trailing edge deviation angle when the incident angle is 0°. After an evaluation function for each of the objective functions is set in the above manner, an optimization simulation using MOGA which is one example of algorithms for Pareto optimization, is performed.

Figure 3:
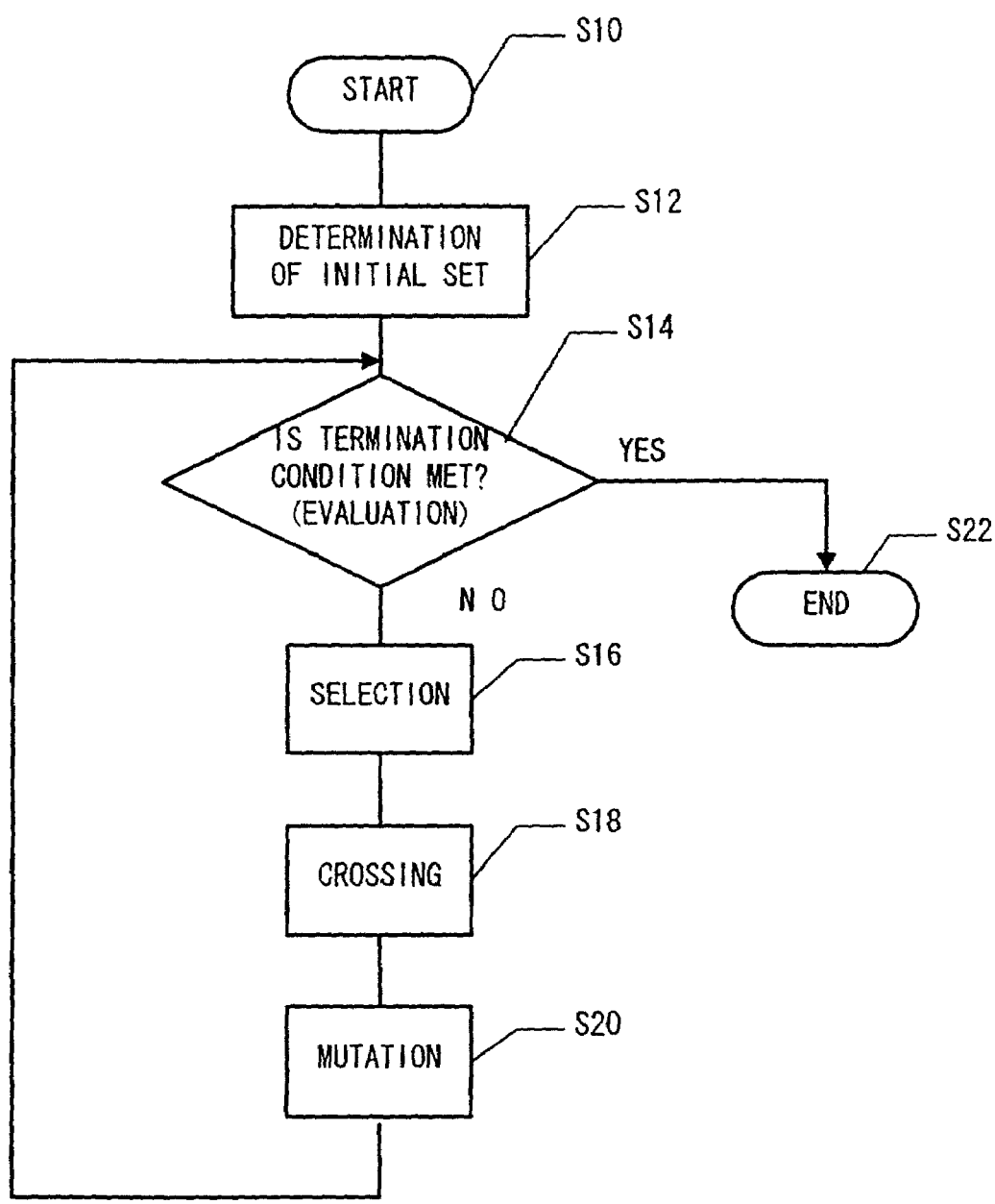
FIG. 3 is a flowchart showing a process procedure of an optimizing method of an embodiment.

FIG. 3 is a flowchart showing an optimization simulation using MOGA. First of all, at Step S10, processes start. Next, at Step S12, an initial set (a group of initial individuals) constituted with individuals having a gene, is determined. The number of individuals may be set to, for example, 96.

When optimization is performed using Genetic Algorithm, a design parameter is ordinarily converted to a binary gene type (binary coding). However, for controlling the design parameter sensitively to allow easy adaptation to a realistic optimization, in the present embodiment, the binary coding is not used but a real number coding (a gene is represented with a real number) is used.

By adopting the real number coding, the gene in the embodiment becomes a real number vector having the same dimension as the number of design parameters. An example of combination of design parameters is shown in Table 1.

TABLE 1

|  | γ | stagger angle |
| --- | --- | --- |
| Variables | PS(1) to PS(4) | pressure surface control points |
|  | SS(1) to SS(4) | suction surface control points |
|  | W1 | wedge-in angle |
|  | W2 | wedge-out angle |
|  | β2 | trailing edge metal angle |
| Constants | r1 | radius of leading edge circle |
|  | r2 | radius of trailing edge angle |
|  | β1 | leading edge metal angle |
|  | c | blade chord length |
|  | σ | solidity (chord/pitch) |

As shown in Table 1, it is possible to set the stagger angle γ to the trailing edge metal angel β2 as variables and fix the radius of leading edge circle r1 to the solidity σ as constants. According to the respective parameters, a profile or shape of a model of a blade can be determined uniquely, as shown in FIG. 4.

Figure 4:
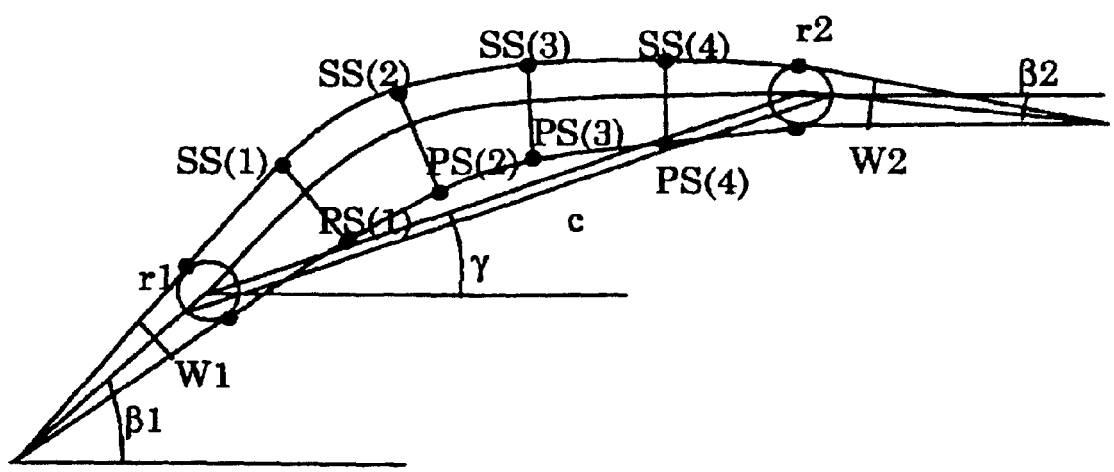
FIG. 4 is an illustrative diagram showing a model of a shape of a blade.

FIG. 4 is an illustrative diagram showing setting of a model of a blade. In an example of FIG. 4, the center of the trailing edge circle is defined by the center of the leading edge circle r1 and the stagger angle γ. A semi-camber is made by connecting the respective positions of the center of the leading edge circle r1, the leading edge metal angle β1, the center of the trailing edge circle r2 and trailing edge metal angle β2 by a third order polynomial. Lines respectively connecting the pressure surface control points PS(1) to PS(4) and the suction surface control points SS(1) to SS(4) are perpendicular to the semi-camber.

The blade surfaces are formed by seventh order polynomials at the pressure side and the suction side respectively, interpolating the pressure surface control points PS(1) to PS(4), the suction surface control points SS(1) to SS(2), points of tangency on the leading edge circle from a vertex of the wedge-in angle W1 and points of tangency on the trailing edge circle from the wedge-out angle W2. In order to make the surfaces smooth, the seventh order polynomials are smoothly connected to the respective tangent lines of the leading edge circle and the trailing edge circle.

In the preparation of the initial set at Step S12 in FIG. 3, the variables in Table 1 are generated at random in a large design space. In order to avoid a meaningless solution, it is preferable to provide such restraints that the trailing edge metal angle β2 is larger than 0° and the thickness of the blade plate is greater than the radius of the trailing edge circle. Furthermore, in order to obtain knowledge about the influence of the shape of the blade plate itself, the value of the solidity is fixed to, for example, "2".

At the next Step S14 shown in FIG. 3, an evaluation is made. The evaluation is made on whether a termination condition is met. The termination condition is met when a solution meeting the required conditions is included in the current set of individuals or the current generation reaches a number of generations, predetermined for preventing simulation from being performed infinitely. It is possible to set the number of generations to be predetermined to, for example, "30". Particularly, the evaluation is made by finding the evaluation values of the objective functions about each individual according to CFD (Computational Fluid Dynamics) computation.

The CFD computation can be made by using two-dimensional Navier-Stokes (NS) equations which use a k-ε turbulence model. The size of grid is determined in consideration of trade-off between the computation time and the computation accuracy. For example, the size may be set to 171×55. A position whose pressure loss coefficient and trailing edge deviation angle are calculated is set in advance. For example, the position can be set at the blade chord after the trailing edge in consideration of damping of outflow. It is possible to properly determine parameters to be considered as boundary conditions. For example, such boundary conditions can be adopted that the entire inflow pressure, the entire inflow temperature, the outflow static pressure, and the inflow angle are considered but the leading edge Mach number is not considered.

Now, in general, the evaluation based upon "pressure loss coefficient" is effective only in a 2-dimensional analysis, while an evaluation based on "efficiency" must be performed in a 3-dimentional analysis. In the present embodiment, since explanation is made based on a 2-dimentional analysis as an example, "pressure loss coefficient" is used, but the present invention is not limited to the 2-dimensional analysis alone. In the text of the specification, the term "pressure loss coefficient" may be understood so as to include the concept of "efficiency" in the case that analysis is conducted in a 3-dimensional manner.

The Genetic Algorithm is characterized in that respective individuals are independent from one another and the CFD computations for respective individuals can be performed simultaneously and independently in a parallel manner. Parallel processing can be performed using MPI (Message Passing Interface) so as to utilize the feature of the Genetic Algorithm. The processing time can be reduced according to the number of CPUs used in the parallel arithmetic processing. By using the CPUs of the same number as that of individuals, it becomes possible to terminate the evaluation for almost fixed calculation time which does not depend on the number of individuals.

At Step S14, when any one of the above termination conditions is met, processes are terminated at Step S22. In a case that the evaluation has been conducted up to the set number of generations, the number of NS computations required is the value or number obtained by calculation of the number of individuals (for example, 96)×the number of generations (for example, 30 generations)×the number of evaluation points of pressure loss coefficient (total three points including one point required for the pressure loss coefficient (PL (0)) of the whole axial compressor and two points required for evaluation of incidence toughness (PL (±5)). Accordingly, by performing parallel computation at Step S14, it becomes possible to largely shorten the computation time. When any one of the termination conditions is not met, the process goes to Step S16.

At Step S16, selection of individuals is performed. The selection is performed by ranking the respective individuals according to the evaluation values of the objective functions obtained at Step S14.

As a ranking method, for example, such a method can be employed that the number of dominant individuals in an objective function space is added with 1 so that determination to every individual is made (Fonseca's ranking method described in "Proceeding of the 5$^{th}$ International Conference on Genetic Algorithms, 1993, pp. 416–423). A probability that individuals are reserved (selected) according to ranks is determined. The selective probability of individual is calculated not according to the evaluation value directly but to the dominance property in the objective function space as in the following equation (4).

$$Pi = C \cdot (C-1)^{i-1} \qquad (4)$$

Here, "Pi" is a selective probability, "C" is a constant (which is equal to a selective probability of Pareto individuals whose ranks are "one"), and "i" is a rank. That is, in the equation (4), the selection probability Pi of each individual is determined on the basis of the constant C which is the selection probability of the Pareto individuals whose ranks are "one".

In order to reach a stable Pareto solution, it is preferable to perform elite reservation. That is, such a approach can be adopted that, except for individuals with a high rank (elite individuals), selection for the remaining individuals is conducted on the basis of the ranks and the reserved elite individuals are returned finally.

In MOGAs, a genetic drift where variety of an individual group is lost may occur in a process of selection based on probability. Therefore, for overcoming this problem, it is preferable to use a shearing method. Thereby, the selective probability to individuals existing in the design parameter space with high density can be reduced.

After the individuals to be left in the next generation are selected at Step S16, processes for causing crossing and mutation are performed under predetermined probabilities at Step S18 and Step S20, respectively. The crossing or the mutation can be performed according to the method described in, for example, a document "Michalewicz, Z., Genetic Algorithm+Data Structures=Evolution Programs, Third, Revised and Extended Edition, 1996, Springer-Verlga, Berlin, Heidelberg". The crossing to the real numbers disclosed in this document is conducted in the following equation (5).

$$X(\lambda i) \leftarrow c_1 A(\lambda i) + c_2 B(\lambda i),$$

$$Y(\lambda i) \leftarrow c_1 B(\lambda i) + c_2 A(\lambda i) \qquad (5)$$

Here, "A" and "B" are parents, and "X" and "Y" are children. Also, "λi" represents a design parameter. That is, "i" is a number representing any integer of 1 to N, and "N" represents the number ("6" in Table 1) of the design parameters which are variables. In "$c_1$" and "$c_2$", there are conditions "$c_1+c_2=1$" and "$0 \leq c_1, c_2$". As understood from the expression (5), the crossing in the case that a real number is used, is performed by employing a weighed mean of parents. On the other hand, as the mutation in the case that real numbers are used, it is possible to perform addition to a vector representing real numbers.

Once the processes of Step S16 to Step S20 have been terminated, an individual group where one generation has advanced can be obtained. Following Step S20, the process returns back to Step S14, again, where evaluation to an individual group of a new generation is made.

In the above manner, it becomes possible to optimize all of a plurality of objective functions including the incidence toughness while considering a trade-off.

Figure 5:
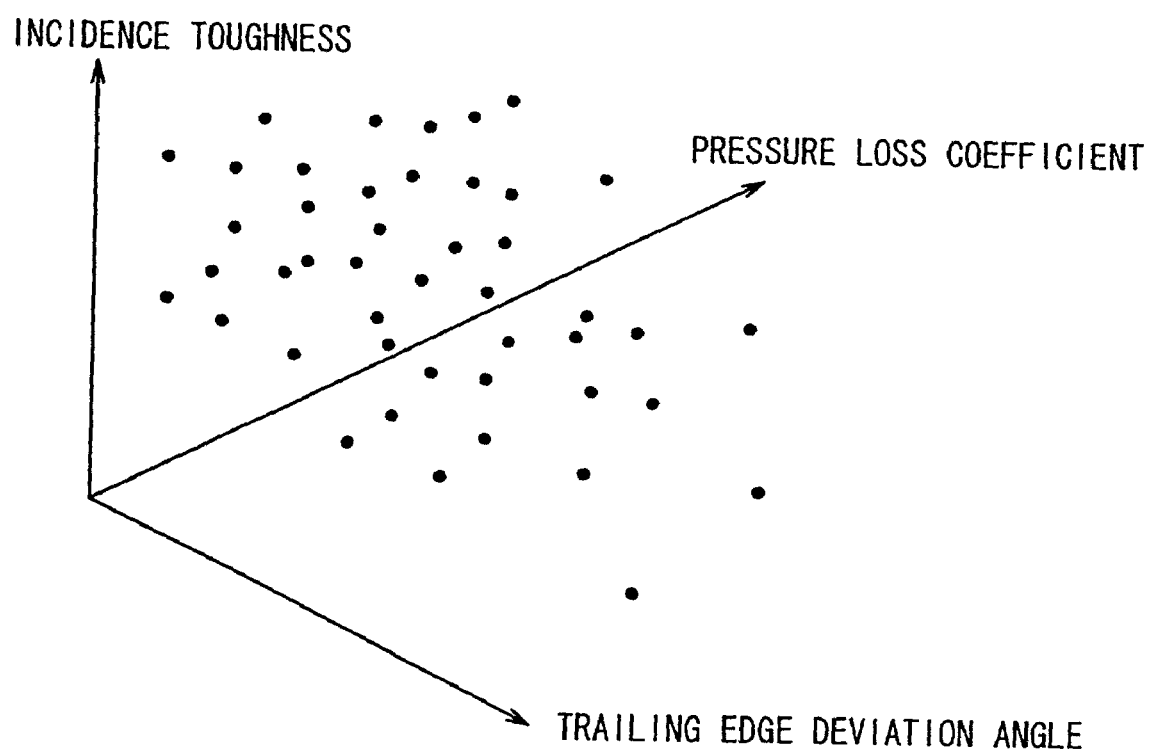
FIG. 5 is an illustrative diagram showing a distribution of solutions obtained according to the optimizing method of the embodiment.

FIG. 5 is an illustrative diagram showing a result obtained by the method shown in FIG. 3. In a 3-dimensional coordinate system shown in FIG. 5, the incidence toughness, the pressure loss coefficient and the trailing edge deviation angle are parameters. A plurality of points distributed in this space represents individuals in the final generations, respectively. A direction from the space where the individuals are distributed to a crossing point of the three coordinate axes is an optimization direction. By using the ranking method and the elite reservation at Step S16 in FIG. 3, most of the individuals shown in FIG. 5 form a Pareto front directing towards the optimization direction. A designer of a blade may select ones which attain the object in performance, from the individuals on the Pareto front. Then, the shape of the blade can be determined using the parameters of the genes of the selected individuals.

Figure 6:
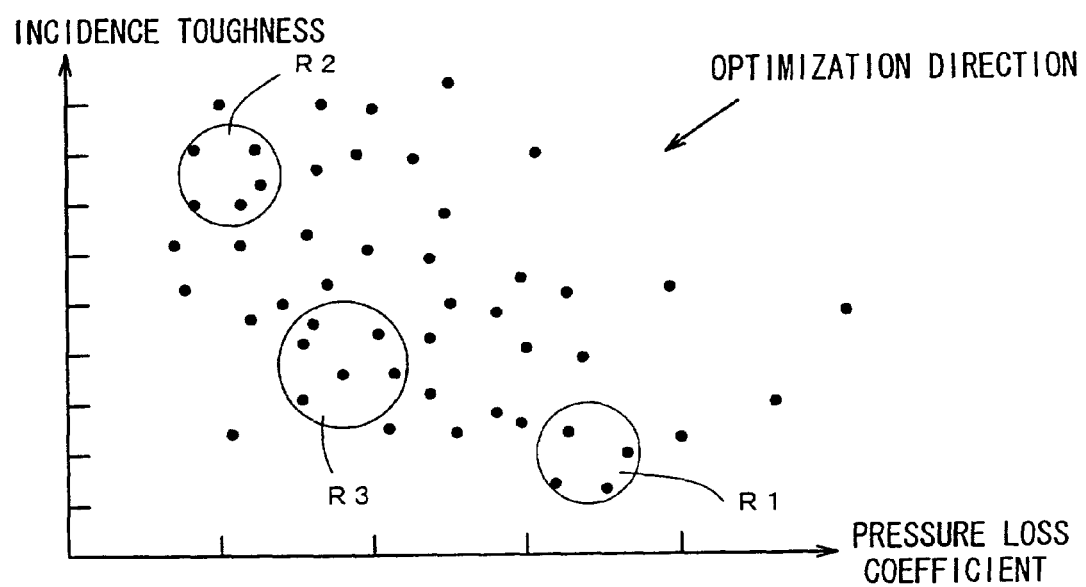
FIG. 6 is an illustrative diagram showing a distribution of solutions when the distribution in FIG. 5 is viewed in a 2-dimensional manner.

FIG. 6 is an illustrative diagram showing an aspect of the example of FIG. 5 viewed from a direction opposed to the direction of an axis of the trailing edge deviation angle. That is, in FIG. 6, a trade-off relationship between the incidence toughness and the pressure loss coefficient is shown. The Pareto front, which should originally have a 3-dimension shape, has become unclear by viewing it in a 2-dimensional manner.

As represented by arrow showing the optimization direction in FIG. 6, as the values of the incidence toughness and the pressure loss coefficient are lowered, the degree of optimization is increased. Accordingly, by adopting the individuals existing in a surrounded region R1 shown in FIG. 6, it is made possible to design a blade having a shape excellent in incident toughness. Similarly, by adopting the individuals existing in a region R2, it is made possible to design a blade having a shape excellent in pressure loss coefficient. Also, when it is desired to achieve a blade balanced between the incidence toughness and the pressure loss coefficient, the individuals existing in an intermediate region R3 may be adopted.

Figure 7:
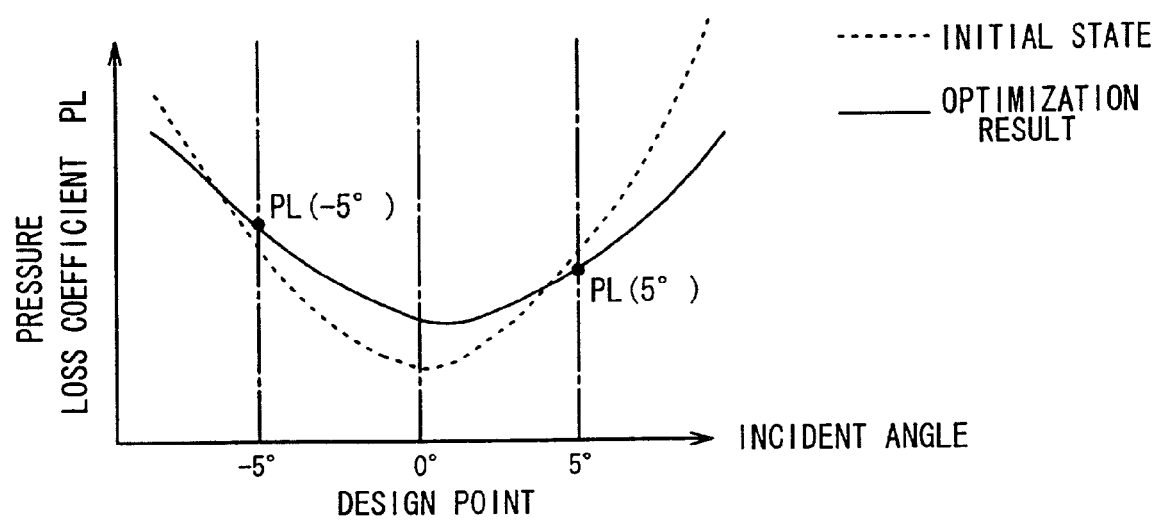
FIG. 7 is an illustrative diagram showing one example of a profile regarding change in incident angle, which is provided by a shape which has been obtained according to an optimizing method of the embodiment.
Figure 8:
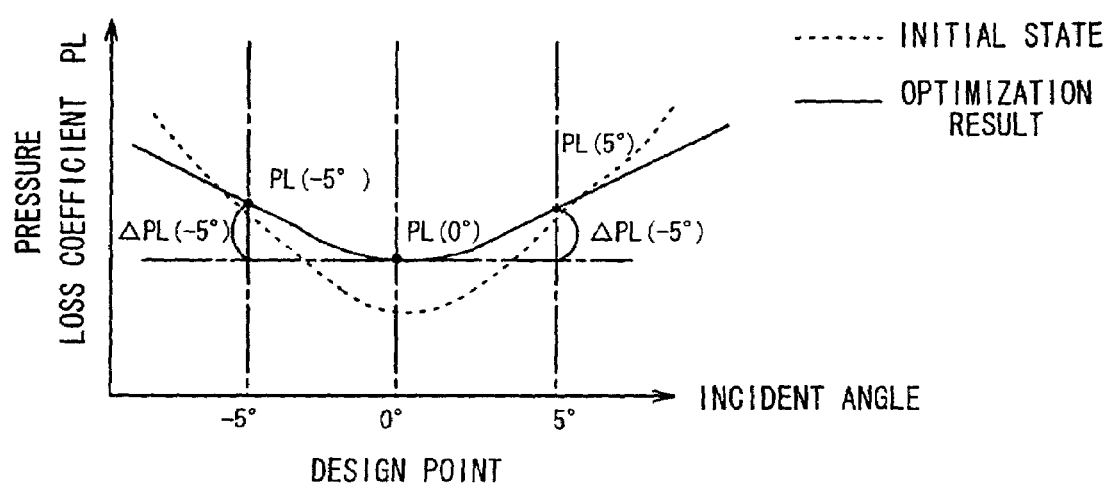
FIG. 8 is an illustrative diagram showing another example of a profile regarding change in incident angle, which is provided by a shape which has been obtained according to an optimizing method of the embodiment.

Next, different results achieved due to any one of the equations (1) to (3) to be adopted will be explained. FIG. 7 and FIG. 8 are illustrative diagrams showing results obtained when optimizations are performed using the equations (1) and (3). In these figures, the abscissa represents the incident angle and the ordinate represents the pressure loss coefficient. In either of the figures, an initial stage prior to optimization is represented with a dotted line, and the result of optimization is represented with a solid line. Points used for evaluation in the respective equations (1) and (3) are represented with black dots. The performance of the axial compressor becomes more excellent as a point on the profile at the design point (0 degree), which is a measure of pressure loss coefficient, is positioned lower in the drawings, namely the amount of increase in pressure loss coefficient is less.

As apparent from comparison between the both figures, in the case of FIG. 7 where the equation (1) is used, the degree of deterioration of the pressure loss coefficient (the amount of increase in pressure loss coefficient from the initial state) becomes less than the case of FIG. 8 using the equation (3). This is because the equation (3) is an equation for minimizing the sum of the differences in pressure loss coefficient between incident angles of ±5° and the design point (ΔPL (−5°) and ΔPL (+5°) shown in FIG. 8) and therefore results in deterioration of pressure loss coefficient at the design point.

Furthermore, as apparent from FIG. 7, such a tendency has been observed from a plurality of results of optimization that, when the profile of loss coefficient of a blade with a shape which has been optimized using the equation (1) is compared with the profile in an initial state, the increase in pressure loss coefficient of the former is less than that of the latter on the plus side of the incident angle while that of the former is more than that of the latter on the minus side of the incident angle. A similar tendency has been observed between a shape where the incidence toughness has been optimized and a shape where another objective function other than the incidence toughness has been optimized.

Figure 9:
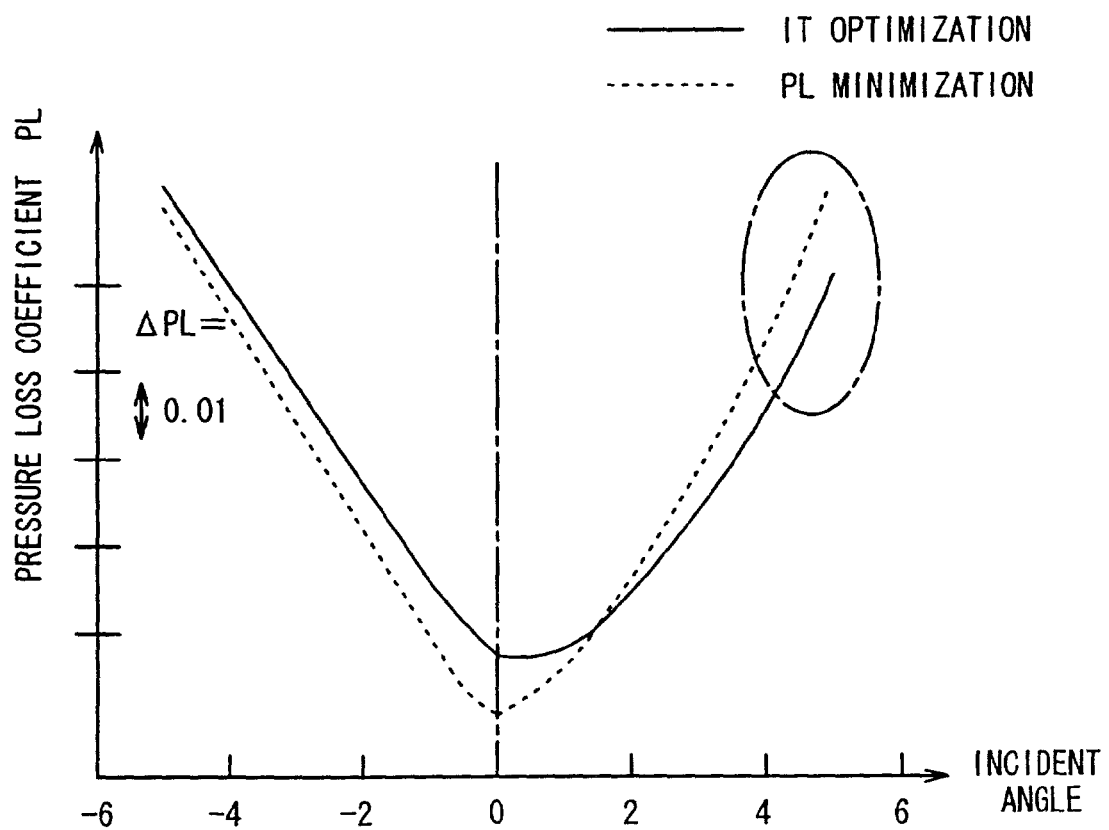
FIG. 9 is an illustrative diagram showing a difference between a profile where incidence toughness has been optimized and a profile where a pressure loss coefficient has been minimized.

FIG. 9 is an illustrative diagram showing a tendency of profiles for the pressure loss coefficient regarding a shape optimizing incidence toughness (IT optimization shape) and a shape minimizing pressure loss coefficient (PL minimization shape). In this figure, a solid line represents a profile of an IT optimization shape and a dotted line represents a profile of a PL minimization shape, respectively. The size of one division on the ordinate representing the pressure loss coefficient corresponds to 0.01.

A profile of a shape minimizing the trailing edge deviation angle has been omitted on FIG. 9. This is for easiness to see the figure, because, as compared with the IT optimization shape, a meaningful difference in profile can not be found between the PL minimization shape and the shape minimizing the trailing edge deviation angle. Of course, there is actually a difference that the profile where the pressure loss coefficient is minimized is positioned at an incident angle of 0° below the profile where the trailing edge deviation angle is minimized, because of a difference in object between the former profile for minimizing the pressure loss coefficient and the latter profile for minimizing the trailing edge deviation angle.

Like FIG. 7, even in FIG. 9, the pressure loss coefficient of the IT optimization shape is lower than that of the PL minimization shape at a high incident angle portion surrounded by a dotted-dashed line circle like FIG. 7. Also, the incident angle at which the pressure loss coefficient becomes minimum in the IT optimization shape is larger than that in the PL minimization shape (in this example, the difference in angle is 1°).

Figure 10:
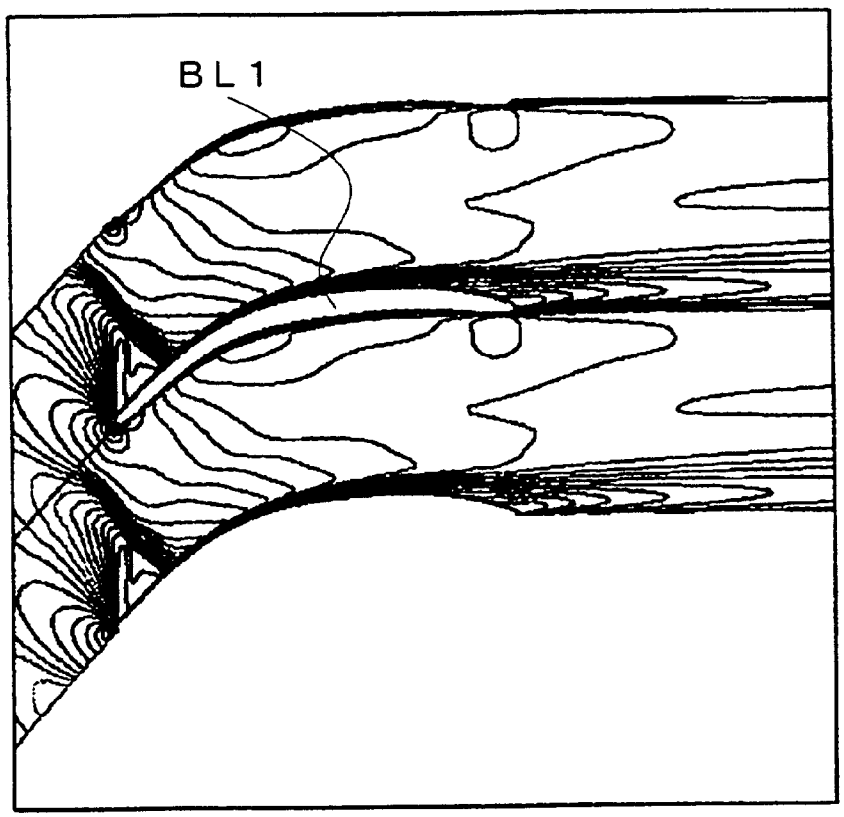
FIG. 10 is a distribution diagram showing contour lines of Mach number regarding a blade with a shape whose incidence toughness has been optimized.
Figure 11:
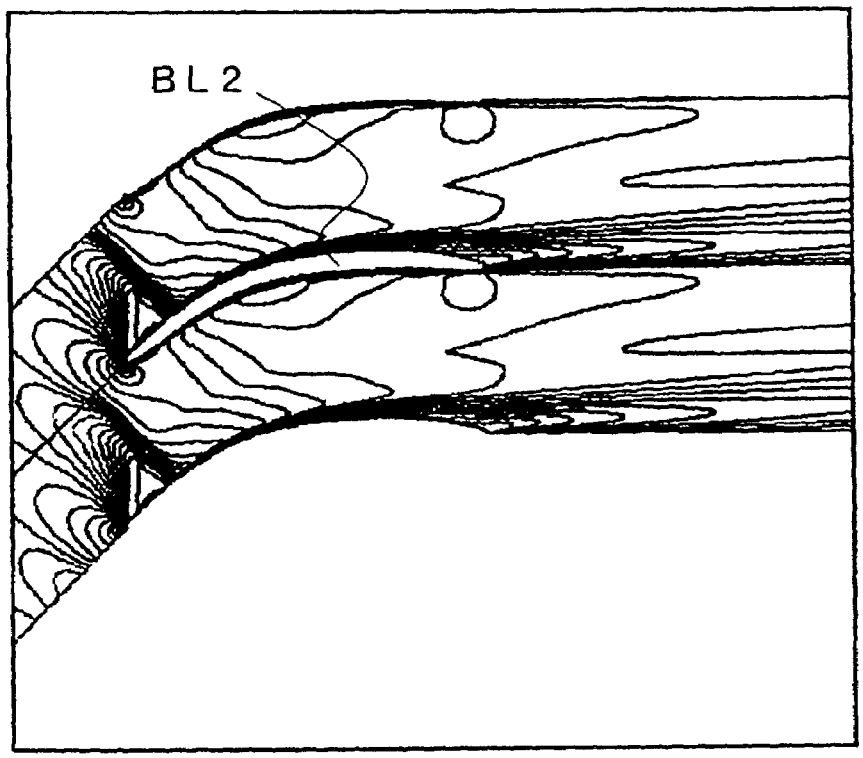
FIG. 11 is a distribution diagram showing contour lines of Mach number regarding a blade with a shape whose pressure loss coefficient has been minimized.

The fact that, as the incident angle is increased, the flow condition becomes severe is well known. FIG. 10 and FIG. 11 are respectively distribution diagrams of Mach number contours regarding a blade BL1 having the IT optimization shape and a blade BL2 having the PL minimization shape. Both the diagrams have been prepared under the condition of such a high incident angle as 5°.

As understood from comparison between FIG. 10 and FIG. 11, the boundary layer separation in the blade BL1 having the IT optimization shape is less than that in the blade BL2. There is a very important meaning in that the boundary layer separation which affects the thickness of the outflow and which increases the friction loss can be reduced in a case of a severe flow condition.

As shown in FIG. 9, even though the pressure loss coefficient is sacrificed on a low incident angle side, the pressure loss coefficient is made relatively small on a high incident angle. Accordingly, the optimization method of the present embodiment, which allows design of a blade with such a shape as mentioned above, is a very preferable.

As mentioned above, in the present embodiment, the method which optimizes the incidence toughness, the pressure loss coefficient and the trailing edge deviation angle, in consideration of a trade-off relationship among them, has been explained. According to this method, it becomes possible to design a blade of a shape whose incidence toughness is optimized, thereby achieving stabilization of operation of an axial compressor.

In the above explanation, such a case has been explained in which operations of the axial compressor are stabilized by a blade designed to be excellent in incidence toughness. However, an application of the present invention is not limited to an axial compressor alone. For example, it becomes possible to achieve a stable flying by applying the method of the present embodiment to a design of a wing of an airplane.

Incidentally, the designing method of the present embodiment can be recorded on such a recording medium as a CD-ROM, a FD (flexible disc) or the like and it is possible to read this method from the recording medium to implement it by a computer.

According to the present invention, it becomes possible to design a blade having a shape which is hardly affected by change of an incident angle and which can achieve a stable operation.

What is claimed is:

1. A computer-implemented method for designing a shape of a blade having operational stability while optimizing a plurality of objective functions including incidence toughness that indicates operation stability of the blade and at least one of a trailing-edge deviation angle, a pressure loss coefficient, a maximum slope of blade surface Mach number for pressure distribution, a lift/drag ratio, and a blade load, the method comprising the steps for:
    performing an optimization analysis on the plurality of objective functions according to Pareto optimization approach;
    selecting Pareto solutions from the optimization analysis for optimal relationship between the objective functions; and
    determining the incidence toughness from first and second evaluation values of a parameter at first and second incident angles whose signs are, respectively, opposite to each other about an incident angle with respect to a design point on the blade.

2. The computer-implemented method according to claim 1, wherein the absolute values of the first and second incident angles are 10° or less.

3. A computer-implemented program stored on computer-readable medium for designing a shape of a blade having operational stability while optimizing a plurality of objective functions when executed on a computer to:
    execute a step where incidence toughness that indicates operation stability of the blade and at least one of a trailing edge deviation angle, a pressure loss coefficient, a maximum slope of blade surface Mach number or pressure distribution, a lift/drag ratio, and a blade load are a set of the plurality of objective functions;
    perform optimization analysis according to Pareto optimization approach on the plurality of objective functions so that Pareto solutions are obtained that optimize a relationship between the plurality of objective functions; and
    the incidence toughness from first and second evaluation values of a parameter at first and second incident angles whose signs are, respectively, opposite to each other about an incident angle with respect to a design point on the blade.

4. The computer-implemented program according to claim 3, wherein the absolute values of the first and second incident angles are 10° or less.

* * * * *